March 20, 1962  B. DUBSKÝ ETAL  3,026,491
INDIRECTLY EXCITED ELECTROMAGNETIC FEELER
Filed Sept. 23, 1958
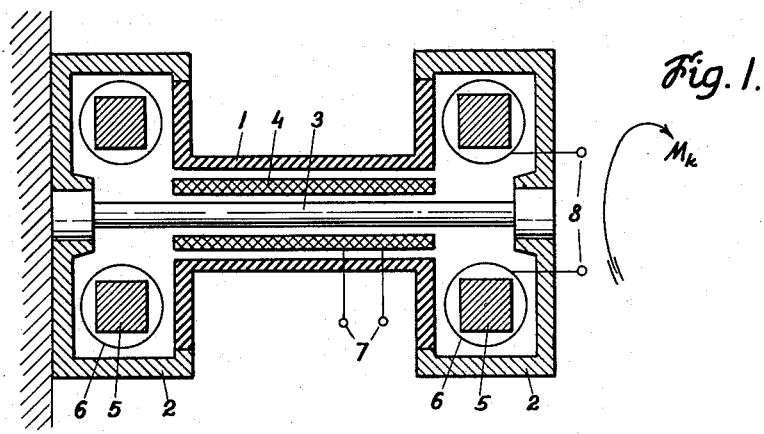
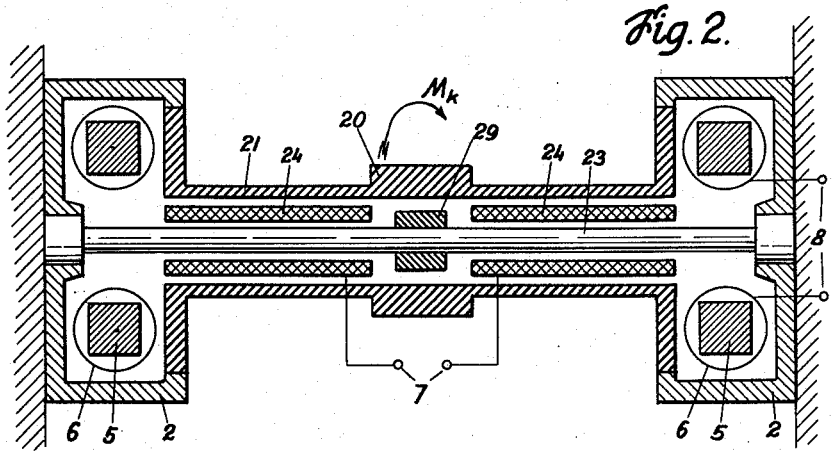
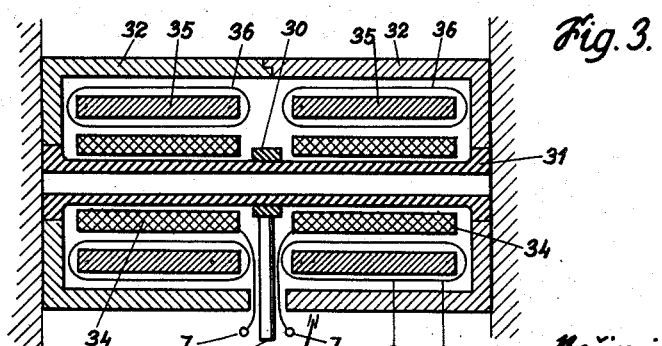
INVENTORS
Bořivoj Dubský, Oldřich
Straka, Jaroslav Jiřík, Václav
Sedláček
By Richard Low agt 3,026,491
INDIRECTLY EXCITED ELECTRO-
MAGNETIC FEELER
Bořivoj Dubský, Oldřich Straka, and Jaroslav Jiřík, Prague, and Václav Sedláček, Horni Pocernice, Czechoslovakia, assignors to Vyzkumny a zkusebni letecky ustav, Letnany, near Prague, Czechoslovakia
Filed Sept. 23, 1958, Ser. No. 762,729
Claims priority, application Czechoslovakia Oct. 2, 1957
15 Claims. (Cl. 336—20)

The present invention relates to an indirectly excited electromagnetic feeler adapted to transform a mechanical value into an electric value.

Electromagnetic feelers which, for the purpose of transforming a mechanical value into an electric value, utilize the so-called Wiedemann effect are usually excited by means of a toroidal coil which passes through a torsional body, or are directly excited by an exciting current flowing through the body. Excitation by means of a toroidal coil extending through the torsional body removes the influence of induction from the supply conductors leading the exciting current to the pick-up coil and permits a reduction of the exciting current to appropriate values in large feelers, but is unsatisfactory as to its design and relatively costly in serial production. Direct excitation is usually not feasible in large feelers, because if the feeler has to be excited to a saturated state, the exciting currents of such feelers are exceedingly high.

A specific illustrative indirectly excited electromagnetic feeler embodying the principles of the present invention comprises, an annular core, provided with a toroidal coil, placed inside a space defined by a torsional body made of a ferromagnetic material and having the shape of a tube with a flange and with at least one casing also of a ferromagnetic material and having a cylindrical shape, the ends of the torsional body and of the casing being rigidly and conductively connected, producing thus a short circuited coil around the core.

Alternating current flowing through the winding of the toroidal core induces in the torsional body an exciting current required for the generation of a rotational magnetic field. This type of excitation is very simple. The winding arranged on the toroidal core may be wound on winding machines and is therefore not costly in production. The arrangement of the torsional body and of the casing so as to provide a short-circuited coil renders possible a design of fully closed feelers, which may be easily protected against influences of the weather and which may be used even under tropical conditions.

The accompanying drawing shows several examples of the feeler according to the present invention.

FIG. 1 shows in a longitudinal section a simple feeder in which the operative part of the torsional body is outside the pick-up coil, FIG. 2 shows also in a sectional view a similar feeler in a dual arrangement and FIG. 3 shows in a sectional view a feeler in which the torsional body is inside the pick-up coil.

The electromagnetic feeler according to FIG. 1 comprises a torsional body in the shape of a tube made of a ferromagnetic material, the end walls of which are rigidly and conductively connected to casings 2. The bottoms of both casings 2 are in their axis rigidly and conductively connected to an inner body 3. The casings 2 and the inner body 3 are also advantageously made of a ferromagnetic material. Fitted on the body 3 is a pick-up coil 4, the coil 4 being connected to a pick-up circuit 7. Co-axially mounted inside the casings 2 are annular cores 5 which are provided with exciting toroidal windings 6. Both toroidal windings 6 are connected together and attached to an exciting circuit 8.

Alternating current supplied from the exciting circuit 8 to the winding 6 induces a considerable exciting current in the casings 2, in the torsional body 1 and in the inner body 3, because the bodies 1 and 3 and the casings 2 form a short-circuited coil around the two cores 5. This exciting current generates a rotational magnetic field in the torsional body 1.

If the torsional body 1 is twisted by a torque $Mk$, this rotational magnetic field is deformed so as to comprise a longitudinal component, which is magnetically fed over the casings 2 to the inner body 3 and induces in the pick-up coil a voltage which is proportional to the torque.

The dual feeler according to FIG. 2 comprises also a torsional body 21 provided with a collar 20 and rigidly and conductively connected with its end walls to casings 2, the bottoms of which are connected along their axis to an internal body 23. Inside the casings 2 are annular cores 5 equipped with toroidal windings 6 connected to an exciting circuit 8. Secured in the centre of the internal body 23 is a ring 29. Fitted at each side of the ring 29, on the internal body 23 are pick-up coils 24 connected to a pick-up circuit 7.

The operation of the feeler is similar to that of the embodiment according to FIG. 1. However, the feeler is rigidly fastened at both ends and loaded by a torque in the centre of the torsional body 21, where the collar 20 is located. The casings 2, the torsional body 21 and the internal body 23 form a short-circuited coil around the cores 5 and their associated toroidal windings 6.

Exciting current is therefore induced in the torsional body 21, the exciting current producing a rotational magnetic field in the body. Upon twisting of the body 21 the magnetic field is deformed so as to generate longitudinal components of opposite direction, which are fed through the casings 2 to the internal body 23 and induce in the coils 24 a voltage which is proportional to the torque. The ring 29 assists in the separation of the two components of the longitudinal magnetic flux.

The electromagnetic feeler according to FIG. 3 comprises a torsional body 31, the end walls of which are connected to the bottoms of casings 32. Casings 32, which surround the whole torsional body 31, are rigidly and conductively connected in the centre of the feeler. The torsional body 31 is divided by a collar 30 into two halves. Fitted on each half is a pick-up coil 34 and over the coils 34 annular cores 35 are coaxially mounted, the cores being provided with toroidal exciting windings 36. Fastened to the collar 30 is a lever 33 for which a suitable opening is provided between the casings 32.

The torsional body 31 together with the casings 32 form a short circuited coil around the cores 35 and their associated toroidal windings 6. Alternating current which is supplied to the winding 36 induces in the body 31 an exciting current by which the body 31 is rotatively magnetised. If the body 1 is twisted, by means of the lever 33, longitudinal flows are produced in the body 31, inducing in the coils 34 a voltage which is proportional to the twist.

The examples disclosed above cannot by far exhaust all possible arrangements. For instance, the feeler according to FIG. 1 may comprise a single casing only with a single toroidal winding, or the like. The feeler may also be carried out with the pick-up coil 4 outside the torsional body 1. The inner body 3 is in this case of a non-ferromagnetic material.

Electromagnetic feelers according to the present invention may be used with preference everywhere where a mechanical value has to be transformed into an electric value. The feelers may be manufactured in serial production at relatively low cost and, since in the majority of cases they are fully closed, their surface may well be protected against the influences of the weather, so that the feelers may operate even under the most unfavourable climatic conditions, e.g. in the tropics. The arrangement of the feeler secures also a good screening of the pick-up coil against outer magnetic and electrostatic fields.

The above arrangements are only illustrative of the application of the principles of the present invention. Numerous other similar arrangements may easily be devised by those skilled in the art without departing from the spirit and scope of this invention.

We claim:

1. An indirectly excited electromagnetic feeler, comprising in combination, a tubular member of ferromagnetic material having an axis; casing means of ferromagnetic material mounted on said tubular member and defining therewith a space extending about said axis; an annular core member in said space, said core member surrounding said axis; a toroidal exciter winding on said core member; conductor means forming with said tubular member and casing means a short circuited winding about said core member; means for torsionally deforming said tubular member about said axis; and means for detecting a magnetic field produced by the torsional deformation of said tubular member.

2. An indirectly excited electromagnetic feeler, comprising in combination, a tubular member of ferromagnetic material having an axis; a flange member on said tubular member transverse of said axis; casing means of ferromagnetic material mounted on said flange member and defining a space with said flange member and with said tubular member, said space extending about said axis; an annular core member in said space, said core member surrounding said axis; a toroidal exciter winding on said core member; conductor means cooperating with said tubular member, flange member and casing means so as to form therewith a short circuited winding about said core member; means for torsionally deforming said tubular member about said axis; and means for detecting a magnetic field produced by the torsional deformation of said tubular member.

3. An indirectly excited electromagnetic feeler, comprising in combination, a tubular member of ferromagnetic material having an axis and an axial cavity; casing means of ferromagnetic material conductively connected to said tubular member and defining therewith a space extending about said axis and communicating with said cavity; an annular core member in said space, said core member surrounding said axis; a toroidal exciter winding on said core member; conductor means axially extending in said cavity and said space and conductively connecting with said casing means so as to form with said tubular member and casing means a short circuited winding about said core member; means for torsionally deforming said tubular member about said axis; and means for detecting a magnetic field produced by the torsional deformation of said tubular member.

4. An indirectly excited electromagnetic feeler comprising in combination a tubular member of ferromagnetic material having an axis and an axial cavity; casing means of ferromagnetic material conductively connected to said tubular member and defining therewith a space extending about said axis and communicating with said cavity; an annular core member in said space, said core member surrounding said axis; a toroidal exciter winding on said core member; ferromagnetic conductor means axially extending in said cavity and said space and conductively connected with said casing means so as to form with said tubular member and casing means a short circuited winding about said core member; means for torsionally deforming said tubular member about said axis; and means for detecting a magnetic field produced by the torsional deformation of said tubular member.

5. An indirectly excited electromagnetic feeler, comprising in combination, a tubular member of ferromagnetic material having an axis and formed with an axial cavity having two axially spaced open ends; casing means of ferromagnetic material mounted on said tubular member adjacent the two open ends of said cavity, said casing means defining with said tubular member a space extending about said axis; an annular core member in said space, said core member surrounding said axis; a toroidal exciter winding on said core member, said casing means forming a short circuited winding with said tubular member about said core member; means for torsionally deforming said tubular member about said axis; and means for detecting a magnetic field produced by the torsional deformation of said tubular member.

6. An indirectly excited electromagnetic feeler, comprising in combination, a tubular member of ferromagnetic material having an axis and formed with an axial cavity having two axially spaced open ends; two casing means of ferromagnetic material mounted on said tubular member adjacent the two open ends of said cavity respectively, each of said casing means defining with said tubular member a space extending about said axis; an annular core member in each of said spaces, said core member surrounding said axis; a toroidal exciter winding on each of said core members; conductor means connecting said casing means so as to form a short circuited winding with said tubular member about said core members; means for torsionally deforming said tubular member about said axis; and means for detecting a magnetic field produced by the torsional deformation of said tubular member.

7. An indirectly excited electromagnetic feeler, comprising in combination, a tubular member of ferromagnetic material having an axis and formed with an axial cavity having two axially spaced open ends; two casing means of ferromagnetic material mounted on said tubular member adjacent the two open ends of said cavity respectively, each of said casing means defining with said tubular member a space extending about said axis and communicating with said cavity at a respective open end thereof; an annular core member in each of said spaces, said core member surrounding said axis; a toroidal exciter winding on each of said core members; conductor means in said cavity connecting said casing means so as to form a short circuited winding with said tubular member about said core members; means for torsionally deforming said tubular member about said axis; and means for detecting a magnetic field produced by the torsional deformation of said tubular member.

8. An indirectly excited electromagnetic feeler, comprising in combination, a tubular member of ferromagnetic material having an axis; casing means of ferromagnetic material mounted on said tubular member and defining therewith a space extending about said axis; an annular core member in said space, said core member surrounding said axis; a toroidal exciter winding on said core member; conductor means cooperating with said tubular member and casing means so as to form therewith a short circuited winding about said core member; means for torsionally deforming said tubular member about said axis; and a pick-up coil about said axis adjacent said tubular member for detecting a magnetic field produced by the torsional deformation of said tubular member.

9. An indirectly excited electromagnetic feeler, comprising in combination, a tubular member of ferromagnetic material having an axis and an axial cavity; casing means of ferromagnetic material mounted on said tubular member and defining therewith a space extending about said axis and communicating with said cavity; an annular core member in said space, said core member surrounding said axis; a toroidal exciter winding on said core member; conductor means axially extending in said cavity and said space and cooperating with said tubular member and casing means so as to form therewith a short circuited winding about said core member; means for torsionally deforming said tubular member about said axis; and a pick-up coil surrounding said conductor means for detecting a magnetic field produced by the torsional deformation of said tubular member.

10. An indirectly excited electromagnetic feeler comprising in combination a tubular member of ferromagnetic material having an axis and an axial cavity; casing means of ferromagnetic material mounted on said tubular member and defining therewith a space extending about said axis and communicating with said cavity; an annular core member in said space, said core member surrounding said axis; a toroidal exciter winding on said core member; ferromagnetic conductor means axially extending in said cavity and said space and cooperating with said tubular member and casing means so as to form therewith a short circuited winding about said core member; means for torsionally deforming said tubular member about said axis; and a pick-up coil surrounding said conductor means for detecting a magnetic field produced by the torsional deformation of said tubular member.

11. An indirectly excited electromagnetic feeler, comprising in combination, a tubular member of ferromagnetic material having an axis and axially spaced end portions; casing means of ferromagnetic material conductively mounted on said end portions so as to define with said tubular member a space extending about said axis; an annular core member surrounding said axis; a toroidal excited winding on said core member, said casing means and said tubular member forming a short circuited winding about said core member; means for torsionally deforming said tubular member about said axis; and means for detecting a magnetic field produced by the torsional deformation of said tubular member.

12. An indirectly excited electromagnetic feeler, comprising in combination, a tubular member of ferromagnetic material having an axis and axially spaced end portions; casing means of ferromagnetic material conductively mounted on said end portions so as to define a space extending about said tubular member; an annular core member in said space, said core member surrounding said tubular member; a toroidal exciter winding on said core member, said casing means and said tubular member forming a short circuited winding about said core member; means for torsionally deforming said tubular member about said axis; and means for detecting a magnetic field produced by the torsional deformation of said tubular member.

13. An indirectly excited electromagnetic feeler, comprising in combination, a tubular member of ferromagnetic material having an axis and axially spaced end portions; casing means of ferromagnetic material conductively mounted on said end portions so as to define a space extending about said tubular member; two axially spaced annular core members in said space, said core members surrounding said tubular member; a toroidal exciter winding on each of said core members, said casing means and said tubular member forming a short circuited winding about said core members; means mounted on said torsional member intermediate said end portions thereof for torsionally deforming said tubular member about said axis; and means for detecting a magnetic field produced by the torsional deformation of said tubular member.

14. An indirectly excited electromagnetic feeler, comprising in combination, a tubular member of ferromagnetic material having an axis and axially spaced end portions; casing means of ferromagnetic material conductively mounted on said end portions so as to define a space extending about said tubular member; two axially spaced annular core members in said space, said core members surrounding said tubular member; a toroidal exciter winding on each of said core members, said casing means and said tubular member forming a short circuited winding about said core members; a collar mounted on said tubular member; a torsioning member fixedly fastened to said collar and radially extending therefrom between said axially spaced core members, said casing means being formed with a radial opening, and said torsioning member passing outwardly through said opening with clearance, whereby said tubular member may be torsionally deformed about said axis by movement of the portion of said torsioning member passing outwardly through said opening; and means for detecting a magnetic field produced by the torsional deformation of said tubular member.

15. In an indirectly excited electromagnetic feeler, the combination of an elongated ferromagnetic member having an axis, casing means mounted on said elongated member and defining therewith a space extending about said axis, annular core means disposed in said space and surrounding said axis, a toroidal exciter winding on said core means, said elongated member and casing means together forming a short-circuited conductive winding which extends through said core means, means for exciting said toroidal winding so as to establish a cylindrical magnetic field about said elongated member, means for torsionally deforming said elongated member about said axis so as to deform said cylindrical magnetic field and thereby produce a magnetic field component parallel to said axis, and coil means for detecting said parallel magnetic field component.

References Cited in the file of this patent

UNITED STATES PATENTS 433,702     Tesla                    Aug. 5, 1890